United States Patent [19]
Matsui et al.

[11] 3,913,952
[45] Oct. 21, 1975

[54] ROTARY COUPLING FOR SUPERHIGH HYDRAULIC PRESSURE GENERATING APPARATUS

[75] Inventors: Tokio Matsui; Tateo Katayama, both of Oziya, Japan

[73] Assignees: Riken Seiki Kabushiki Kaisha, Oziya; Riken Kiki Kabushiki Kaisha, Tokyo, both of Japan

[22] Filed: Jan. 23, 1974

[21] Appl. No.: 435,727

[52] U.S. Cl. .................. 285/281; 285/352; 64/26
[51] Int. Cl.² .................................. F16L 27/00
[58] Field of Search ........ 64/6, 9, 1 R, 26; 285/281, 285/280, 9 R, 352

[56] References Cited
UNITED STATES PATENTS

| | | | |
|---|---|---|---|
| 2,218,473 | 10/1940 | Minor | 285/281 |
| 2,253,932 | 8/1941 | Gilkerson | 285/281 |
| 2,727,760 | 12/1955 | Fawick | 285/281 |
| 2,797,108 | 6/1957 | Royer | 285/281 |

Primary Examiner—Benjamin W. Wyche
Assistant Examiner—Randall Heald
Attorney, Agent, or Firm—Woodhams, Blanchard and Flynn

[57] ABSTRACT

A fluid connector for use with a superhigh hydraulic pressure generating apparatus comprising a hollow cylinder-shaped casing fixing a first connecting member at one end and rotatably mounting a second connecting member at the other end. A superhigh hydraulic pressure generating apparatus is connected to the front end of the first connecting member while an injection nozzle is connected to the rear end of the second connecting member. At the front end of the second connecting member there is provided an enlarged hole into which a plunger portion of a receiving member is slidably inserted, which receiving member is connected to the second connecting member and is rotatable therewith. Communicating holes are provided in the first and second connecting members and the receiving member, and the rear end face of the first connecting member and the front end face of the receiving member are maintained in a relatively rotatable but sealed abutting engagement with each other.

8 Claims, 3 Drawing Figures

ROTARY COUPLING FOR SUPERHIGH HYDRAULIC PRESSURE GENERATING APPARATUS

BACKGROUND OF THE INVENTION

This invention relates to a superhigh hydraulic pressure generating apparatus and more particularly to a fluid connector for use with a superhigh hydraulic pressure generating apparatus for breaking of baserock.

Heretofore, in tunneling, for example, it is known to inject superhigh pressure water into or against baserock for breaking of the same.

In this case, a superhigh hydraulic pressure generating apparatus may be used having an injection nozzle connected to the apparatus through a fluid connector which permits rotation of the nozzle according to the purpose and condition of operation.

Now, in such a case, a connector which is able to rotate the nozzle effectively has not been provided previously, that is, a conventional connecting device has a drawback of undesired leakage of superhigh pressure water past the seals.

SUMMARY OF THE INVENTION

An object of the invention is to provide an improved fluid connector which can eliminate the above-mentioned drawback.

Another object of the invention is to provide a fluid connector comprising a hollow cylinder-shaped casing having a first connecting member fixedly mounted on one end thereof and a second connecting member rotatably mounted on other end, the front end of the second member being provided with an enlarged hole into which a plunger portion of a receiving member is inserted, the receiving member being connected to the second connecting member so as to be rotatable therewith, and communicating holes are provided in the first and second connecting members and the receiving member. The rear end face of the first connecting member and the front end face of the receiving member are adapted to be is butting engagement, by introducing superhigh pressure water which holds the end faces of the first connecting member and the receiving member constantly in contact during operation which end faces prevent leakage of the water from said connector.

A further object of the invention is to provide a connector in which, on the contact portion between the first connecting member and the receiving member, contact members which are not-integral with the forementioned members are mounted, which contact members can be easily replaced when wear, breakage or the like occurs.

A still further object of the invention is to provide a connector which has a pulley mounted to the second connecting member, and which can rotate a nozzle portion easily by means of other drive means.

A still further object of the invention is to provide a connector having a seal ring within the face of the enlarged hole in the second connecting member, which seal ring presents leakage of water along the periphery of the plunger.

DETAILED DESCRIPTION OF THE INVENTION

Figure 1:
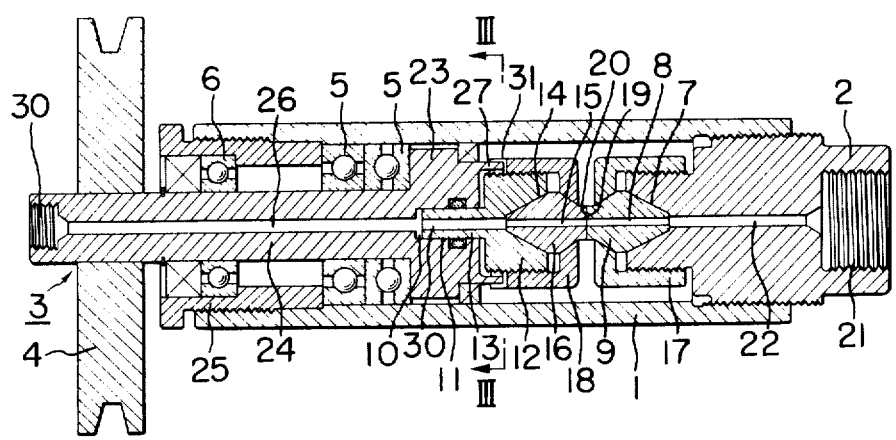
FIG. 1 is a longitudinal sectional view of an embodiment according to the invention.
Figure 2:
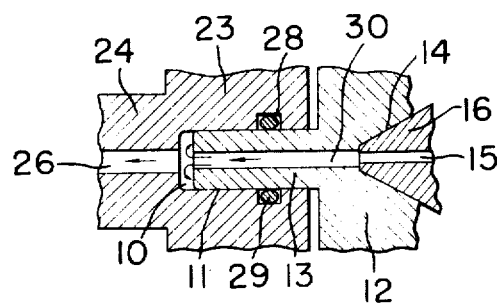
FIG. 2 is an enlarged view of a portion of the embodiment illustrated in FIG. 1.
Figure 3:
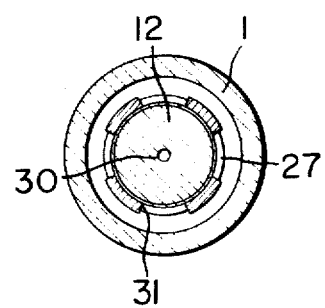
FIG. 3 is a cross-sectional view taken along the line III—III of FIG. 1, viewing in the arrow direction.

In the figures, 1 denotes a hollow cylinder-shaped casing which has internally threaded inner peripheries on its opposite ends, and a second connecting member 2 is threadably mounted on one end and a fastening member 25 on other end.

On the front end of the connecting member 2 there is provided a tapped hole 21 for permitting connection to a conduit associated with a superhigh hydraulic pressure generating apparatus (not shown) member 2 has a hole 22 communicating with said tapped hole, and the rear end of member 2 has a conical hole 7 coaxial with the hole 22, which hole 7 has an inner wall face adapted to contact closely with an outer wall face of a first contact member 9 and into which the first contact member 9, having a hole 8 which communicate with said hole 22, is inserted and fastened by means of a cap 17 threaded onto the rear end of the connecting member 2.

A connecting member 3 is formed with a forward enlarged head portion 23 and a rearward small diameter shaft portion 24 thereof which is rotatably but not displaceable axially received within the casing 1 by bearings 5 and 6 mounted to said small diameter portion 24, and the bearing 6 is supported by a fastening member 25 threaded into the casing 1. The connecting member 3 has an enlarged hole 11 formed in its head 23 and a passage 26 communicating with the enlarged hole 11 and extending through the small diameter portion 24 thereof. A circular groove 28 is provided on the face of the enlarged hole 11, and a seal ring 29 is engaged in said circular groove 28. The head 23 of the connecting member 3 has a plurality of projections 27 projecting axially therefrom. Also, on rear end of the small diameter portion 24 there is provided a tapped hole for connecting to an injection nozzle (not shown) directly or indirectly through other members, and a rotating pulley 4 is fixed to said portion 24.

A plunger portion 13 of a receiving member 12 is sealingly with the seal ring 29 fitted in the circular groove 28. The receiving member 12 has a hole 30 extending axially therethrough and a conical hole 14 at its front end which communicates with said hole 30, and said conical hole 14 has an inner wall adapted to contact an outer conical face of a contact member 16 which projects into the conical hole 14. The contact member 16, which has a hole 15 therethrough is inserted and fastened to the receiving member 12 by means of a cap 18 threaded onto the front end of the receiving member 12. On the end face of said cap 18 there is provided a plurality of notches 31 into which said projections 27 are engaged.

Opposed contact faces 19 and 20 of the contact members 9 and 16 contact each other as shown in FIG. 1 and a suitably gap 10 is formed between the end face of the plunger 13 and the bottom face of the enlarged hole 11.

In this case, as described above, a superhigh hydraulic pressure generating apparatus and an injection nozzle are connected to the first connecting member 2 and the second connecting member 3 respectively to supply the superhigh pressure water from said generating apparatus through said components to the nozzle.

The water thus supplied flows through the holes 22 and 8 of the connecting member 2 and the contact member 9, and through the holes 15, 30 and 26 of the contact member 16, receiving member 12 and the connecting member 3 to the nozzle.

And the connecting member 3 will be rotated in the bearings 5 and 6 within the casing 1 as the pulley 4 is being rotated and this in turn rotates the nozzle connected to the connecting member 3.

At this time, since the projections 27 of the head 23 of the connecting member 3 are engaged in the notches 31 of the cap 18 threadably connected to the receiving member 12, the end face 20 of the contact member 16 rotates with the connecting member 3 while being maintained in face-to-face contact to the corresponding end face of the contact member 9.

The superhigh pressure water supplied to the fluid connector according to the invention also flows into the gap 10 formed at the end of the hole 30 thus forcing the end face of the plunger 13 rightwardly in the FIG. 1. This urges the receiving member 12 rightwardly as a whole, and the end face 20 of the contact member 16, which is engaged with the front end of member 12, is strongly pressed against the opposed end face 19 of the contact member 9. Thus both end faces 19 and 20 are butted closely to prevent leakage of the liquid therefrom. By use of seal ring 29, leakage of the water past the peripheral face of the plunger 13 also may be prevented.

Although a particular preferred embodiment of the invention have been disclosed hereinabove for purpose of illustration, it will be understood that variations or modifications thereof which lie within the scope of the invention as defined by the appended claims are fully contemplated.

For example, direct contact between the respective end faces of the receiving member 12 and connecting member 2 without using of the contact members 9 and 16 is possible.

What is claimed is:

1. A fluid connector for use with a pressure-generating apparatus, comprising a hollow cylinder-shaped casing, a first connecting member fixed to one end of the casing and having a front end thereof adapted to be connected to a pressure generating apparatus, a second connecting member rotatably mounted on the casing adjacent the other end thereof and having a front end portion formed with an enlarged hole and a rear end portion adapted to be connected to an injection nozzle, a receiving member positioned within the casing and having a plunger portion axially slidably received within the enlarged hole formed in the front end portion, means nonrotatably connecting said receiving member to said second connecting member, the first and second connecting members and the receiving member having passages therethrough and in communication with one another to provide for flow of fluid, and the first connecting member having a rear seal face maintained in a relatively rotatable abutting engagement with a front seal face formed on the receiving member for creating a sealed relationship between the receiving member and the first connecting member.

2. A fluid connector according to claim 1, wherein the first connecting member is provided with a first contact member removably mounted thereon, said first contact member having said rear seal face formed thereon adjacent the rearward end thereof, and the receiving member having a second contact member removably mounted thereon and having said front seal face formed thereon adjacent the front end thereof.

3. A fluid connector according to claim 1, wherein a drive pulley is nonrotatably connected to said second connecting member.

4. A fluid connector according to claim 1, further including seal means coacting between said plunger portion and said receiving member for creating a sealed relationship therebetween.

5. A fluid connector according to claim 1, wherein the first and second connecting members are substantially aligned with one another, said receiving member being disposed between and substantially aligned with said first and second connecting members, the passages as formed in said connecting members and said receiving member including a first passage extending through said first connecting member, a second passage extending through said second connecting member, and a third passage extending through said receiving member, said second passage opening into said enlarged hole adjacent the blind end thereof, and said third passage extending through said plunger portion so as to communicate with said enlarged hole when said plunger portion is disposed in said enlarged hole, said plunger portion having the free end thereof spaced from the blind end of said enlarged hole so as to define an enlarged chamber therebetween whereby the fluid flowing through said passages fills said chamber and exerts a pressure force on the free end of said plunger portion which urges said receiving member toward said first connecting member so as to maintain said front seal face in snug engagement with said rear seal face.

6. A fluid connector according to claim 5, wherein the first connecting member has a first conical opening formed on the rear end thereof and has a first removable contact member fixedly seated in said first opening, said first contact member having a fourth passage therethrough in communication with said first passage, said first contact member terminating in an annular planar surface disposed in surrounding relationship to said fourth passage and defining said rear seal face, and said receiving member having a second conical opening in the frontward end thereof and a second removable conically-shaped contact member being seated in said second conical opening, said second contact member having a fifth passage extending therethrough and communicating with said third passage, said second contact member having an annular planar surface formed on the forward end thereof in surrounding relationship to said fifth passage and defining said front seal face.

7. A fluid connector according to claim 6, wherein a first cap member is threadably engaged with said first connecting member for fixedly securing said first contact member thereto, and wherein a second cap member is threadably engaged with said receiving member for fixedly connecting said second contact member thereto.

8. A fluid connector according to claim 2, wherein said first and second contact members respectively have first and second passages extending therethrough and disposed in communication with one another and with the passages formed in the receiving member and the first connecting member, said passages extending substantially along the rotational axis of said second connecting member, and the front and rear seal faces as formed on said contact members being disposed in surrounding relationship to said passages and positioned within a plane extending substantially perpendicular to said rotational axis.

\* \* \* \* \*